United States Patent [19]
Saito et al.

[11] Patent Number: 4,673,921
[45] Date of Patent: Jun. 16, 1987

[54] APPARATUS FOR FINDING THE LOCATION OF A CAR WITHIN A VAST AREA

[75] Inventors: Muneo Saito, Yokkaichi; Shoichi Hayakawa, Aichi, both of Japan

[73] Assignees: Nippondenso Co., Ltd., Kariya; Toyota Jidosha Kabushiki Kaisha, Toyota, both of Japan

[21] Appl. No.: 756,825

[22] Filed: Jul. 19, 1985

[30] Foreign Application Priority Data

Jul. 20, 1984 [JP] Japan .............................. 59-150787

[51] Int. Cl.⁴ ............................................. G08G 1/12
[52] U.S. Cl. .................................. 340/539; 180/287; 307/10 AT; 340/51; 340/63; 340/64; 340/991
[58] Field of Search ............................. 340/988–991, 340/51, 539, 543, 63, 825.49, 825.54, 825.69, 825.72, 696, 52 R, 901, 933, 64; 455/345, 99, 92; 367/903, 99, 124; 180/167, 289, 287; 342/147, 456; 307/10 AT

[56] References Cited

U.S. PATENT DOCUMENTS

| | | | |
|---|---|---|---|
| 3,506,956 | 4/1970 | Kolm et al. | 340/51 |
| 3,665,312 | 5/1972 | Jarvis | 340/989 |
| 3,703,714 | 11/1972 | Andrews | 340/539 |
| 4,019,180 | 4/1977 | Graves | 343/6 A |
| 4,143,368 | 3/1979 | Route et al. | 455/603 |
| 4,177,466 | 12/1979 | Reagan | 340/63 |
| 4,187,497 | 2/1980 | Howell et al. | 340/539 |
| 4,319,230 | 3/1982 | Fowler et al. | 340/63 |
| 4,327,359 | 4/1982 | Kurtz | 340/541 |
| 4,380,822 | 4/1983 | Broton | 367/903 |
| 4,383,242 | 5/1983 | Sassover et al. | 340/539 |
| 4,523,178 | 6/1985 | Fulhorst | 340/539 |
| 4,596,985 | 6/1986 | Bongard et al. | 340/825.69 |

FOREIGN PATENT DOCUMENTS 0180350 10/1983 Japan.
2051442A 1/1981 United Kingdom ............. 340/63

Primary Examiner—James L. Rowland
Assistant Examiner—Brent A. Swarthout
Attorney, Agent, or Firm—Cushman, Darby & Cushman

[57] ABSTRACT

A car-locating system comprises a portable transmitter-receiver unit and a car-mounted transmitter-receiver unit. The portable unit includes a switch, a first directional antenna, a first transmission section, a receiving section and a receipt level display. When it is closed, the switch generates a car-locating instruction. In response to this instruction, the first transmission section transmits a transmitting code through the directional antenna. Any signal received by the directional antenna is demodulated by the receiving section into a response code. The response code is compared with a first prescribed response code. When it is identical with the first prescribed response code, the receiving signal level is displayed by the receipt level display. The car-mounted unit includes a non-directional antenna, a second transmission section and a timer. The non-directional antenna receives the code transmitted from the portable unit. The code contained in the transmitted signal is compared with a transmitting code set in the car mounted unit. When it is identical with the transmitting code, the second transmission section is operated for the period of time set in the timer, thus transmitting a response signal containing a response code through the non-directional antenna.

11 Claims, 19 Drawing Figures

F I G. 7A
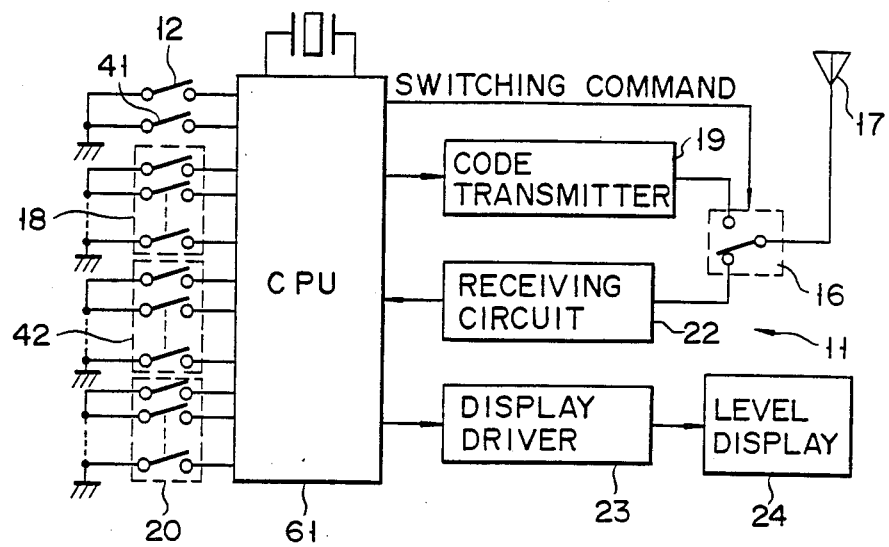
F I G. 7B
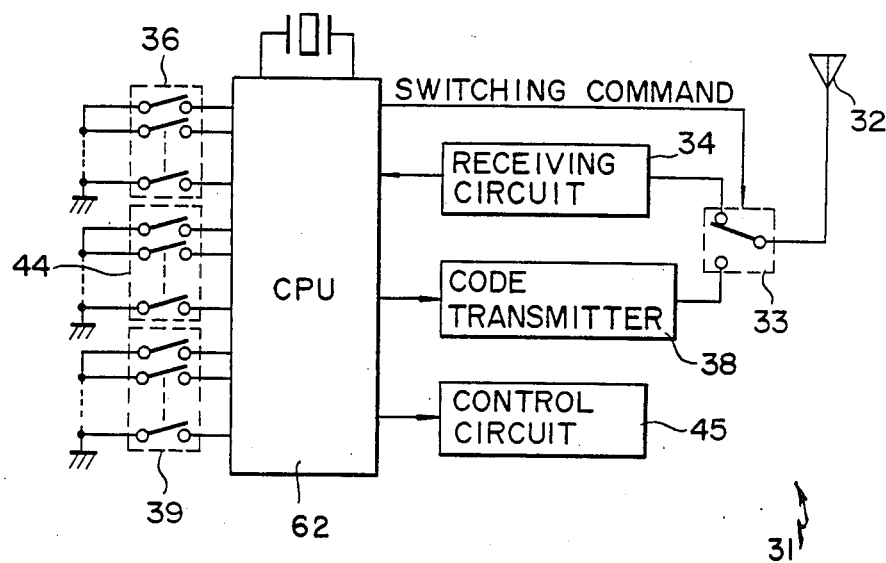

APPARATUS FOR FINDING THE LOCATION OF A CAR WITHIN A VAST AREA

BACKGROUND OF THE INVENTION

The present invention relates to a car-locating system for finding the position of a car in a vast place such as a parking lot, as well as for detecting an alarm from the car and for remote-controlling the door locking mechanism, air conditioner, etc. provided in the car.

When a person returns to a large parking lot, he sometimes cannot remember where he has parked his car and is, therefore, forced to walk around for a long time until he finds it. Similarly, on some occasions, he may ask his friend to retrieve the car from the parking lot, and his friend too usually has to spend much time in locating the car.

In order to locate a car parked in a vast place, a radar system may be used. Alternatively, as disclosed in Japanese Pat. Disclosure No. Sho 58-180350, a radio transmitter that transmits an ID code for as long as a car is parked, is provided in a car. The person looking for the car uses a portable radio receiver to detect the ID code and the direction in which this code is transmitted, thereby locating the car.

A radar system is very complex and too expensive to be used for this purpose. Moreover, even if used to locate a parked car, the system cannot distinguish it from the other cars parked in the same place. When a radio transmitter and a radio receiver are used, two problems arise. First, since the transmitter must emit the ID code for the duration the car is parked, it quickly uses up the car's battery. Secondly, when many ID codes are transmitted from other cars parked in the same parking lot, the receiver may pick up a wrong ID code, inevitably guiding its holder to the wrong parking space.

SUMMARY OF THE INVENTION

Accordingly, it is the object of this invention to provide a system for locating cars in a vast place such as a parking lot, assisting drivers to quickly find their cars.

Another object of the invention is to provide a system using two radio transmitter-receiver units, one being portable and the other installed in a car, to locate a car parked in a vast place without consuming too much of the car's available electric power.

Still another object of the invention is to provide a system which can detect and identify a car parked in a vast parking lot even when many other cars, using similar locating devices, are parked in the same parking lot.

A further object of this invention is to provide a system which can not only locate a car parked in a vast place together with many other cars, but that can also remote-control various devices installed in the car in addition to detecting a problem occurring with the car.

According to this invention, there is provided a car-locating system which comprises two transmitter-receiver units. The first unit is portable and equipped with a code transmission switch and a direction antenna, and the second unit is installed in the car. When the code transmission switch is operated, the first unit transmits an ID code. The second unit receives this code and compares it with the ID code of the car. When the ID code is identical with the ID code assigned to the car, the second unit outputs a response code. The first unit receives the response code and indicates the direction in which this code is transmitted, owing to the use of a directional antenna.

The second transmitter-receiver unit emits a response code when the ID code from the first transmitter-receiver unit is identical with the ID code assigned to the car. In other words, it need not transmit a code for the entire duration the car is parked. For this reason, the second unit consumes but very little power, ensuring longevity of the car's battery. For the same reason, the car can easily be located, even if many other cars with radio devices similar to the second unit are parked in the same parking lot.

The first transmitter-receiver unit may have at least one instruction switch in addition to the code transmission switch. When the instruction switch is operated, the first unit emits an instruction code. The second transmitter-receiver unit receives this code and outputs a code for releasing the door lock mechanism, starting the air conditioner, or actuating other devices installed in the car. Therefore, the door lock mechanism is released, the air conditioner is started, or the other devices are actuated shortly before the driver reaches the car.

Moreover, the second transmitter-receiver unit may be connected to various sensors provided in the car. In this case, the second unit emits an alarm code when any sensor detects a problem within the car.

BRIEF DESCRIPTION OF THE DRAWINGS

FIGS. 7A and 7B are block diagrams of the portable transmitter-receiver unit and car-mounted transmitter-receiver unit used in a fifth embodiment of the present invention;

DETAILED DESCRIPTION OF THE PREFERRED EMBODIMENTS

Figure 1A:
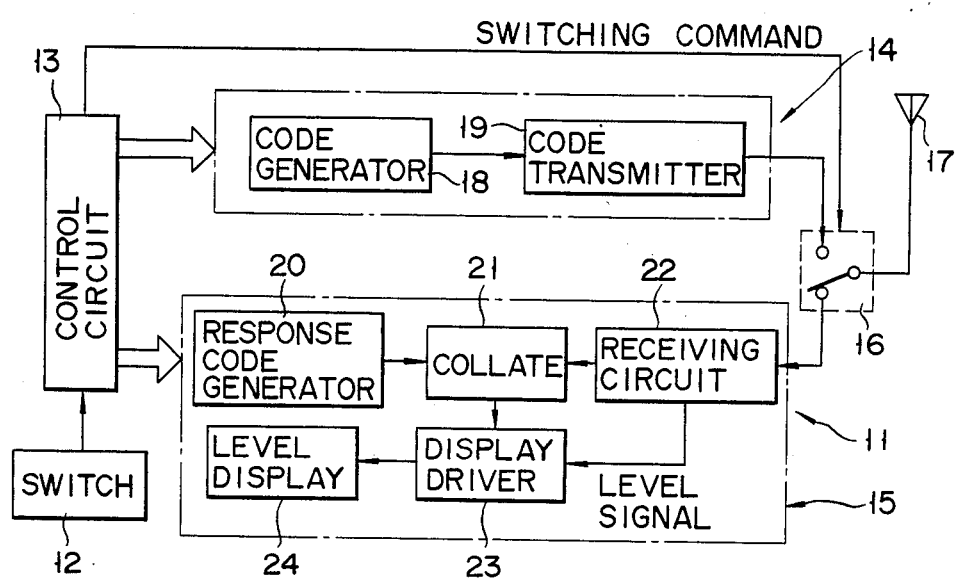
FIGS. 1A and 1B are block diagrams of the portable transmitter-receiver unit and car-mounted transmitter-receiver unit used in a first embodiment of the present invention.

FIG. 1A shows a portable transmitter-receiver unit 11 to be operated to locate a car parked in a vast parking lot where many other cars are parked. Unit 11 comprises a first switch 12, a control circuit 13, a transmission section 14, a receiving section 15, a changeover switch 16 and a directional antenna 17. When first switch 12 is closed, it supplies an instruction to control circuit 13. In response to this signal, circuit 13 supplies an actuation signal to transmission section 14. As long as first switch 12 is open, circuit 13 supplies an actuation signal to receiving section 15. Sections 14 and 15 can be selectively coupled, by changeover switch 16, to antenna 17. Switch 16 connects transmission section 14 to antenna 17 when this section is operated. It also connects receiving section 15 to antenna 17 when section 15 is operated.

Transmission section 14 includes a code transmitting generating circuit 18 and a code transmission circuit 19. When first switch 12 is closed and transmission section 14 starts operating, circuit 18 supplies the data representing the code of portable transmitter-receiver unit 11 to circuit 19. Circuit 19 modulates the code data and outputs a transmitting signal. The signal is supplied to antenna 17 through switch 16. Antenna 17 emanates radio waves, thus transmitting this signal.

Receiving section 15 includes a response code generating circuit 20, a collating circuit 21, a receiving circuit 22, a display drive circuit 23 and a level display 24. Receiving circuit 22 receives a radio wave signal from antenna 17 through switch 16 when section 15 is connected to antenna 17. Circuit 22 demodulates the receiving code. Collating circuit 21 compares this code with the response code output from circuit 20.

When the receiving code data is identical with the response code, collating circuit 21 gives a display drive an instruction to display drive circuit 23. Receiving circuit 22 supplies a level signal to circuit 23. This signal is indicative of the level of the radio waves caught by antenna 17. Circuit 23 supplies the level signal to level display 24 which displays the level of the radio waves.

Figure 2:
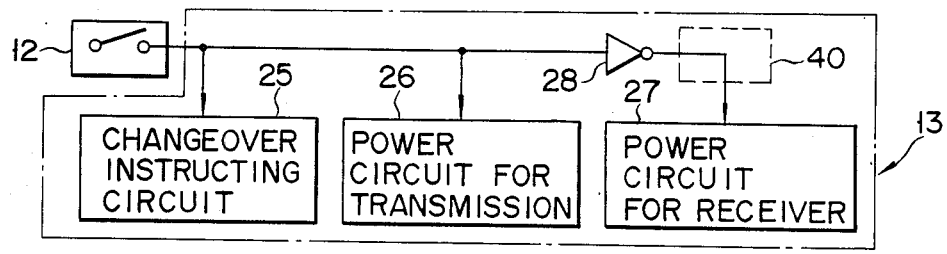
FIG. 2 shows the power supply section of the portable transmitter-receiver unit shown in FIG. 1A.

As shown in FIG. 2, control circuit 13 comprises a changeover instructing circuit 25, a power supply circuit 26 for transmission section 14 and a power supply circuit 27 for receiving section 15. When first switch 12 is closed, circuits 25 and 26 are started, operating transmission section 14. Hence, circuit 19 outputs the signal. Circuit 25 supplies a changeover instruction to switch 16, and switch 16 connects transmission section 14 to antenna 17. As a result, antenna 17 emits the radio waves, thus transmitting the signal. Meanwhile, the output signal of first switch 12 is supplied to power supply circuit 27 through an inverter 28. Therefore, circuit 27 supplies power to receiving section 15 as long as first switch 12 is open. In the case of FIG. 2 where switch 12 is open, circuit 25 generates no changeover instruction to switch 16. In this case, switch 16 couples receiving section 15 to antenna 17. Hence, until first switch 12 is closed, portable transmitter-receiver unit 11 remains in a signal-waiting condition.

Figure 1B:
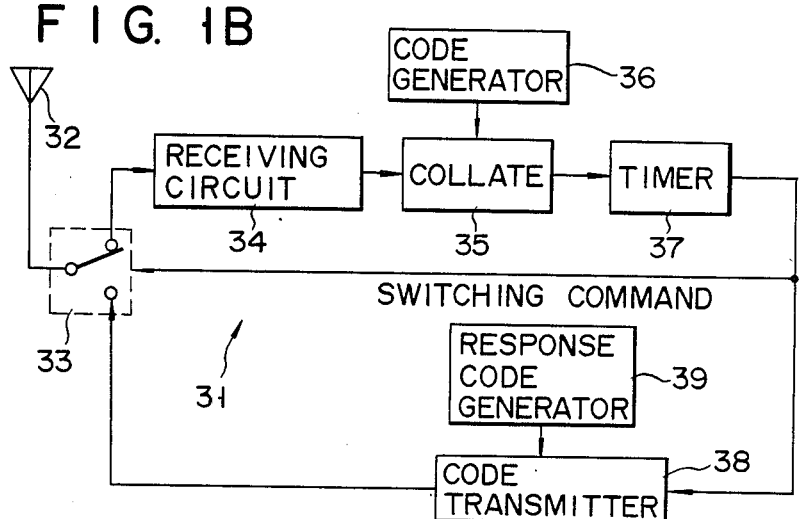

FIG. 1B shows another transmitter-receiver unit 31 installed within the car. This car-mounted unit has a non-directional antenna 32, a changeover switch 33, a receiving circuit 34, a collating circuit 35, a code generating circuit 36, a timer 37, a code transmission circuit 38 and a response code generating circuit 39. Changeover switch 33 usually connects antenna 32 to receiving circuit 34. When antenna 32 catches any radio waves, circuit 34 generates code data corresponding to these radio waves. Collating circuit 35 compares this data with the data supplied from code generating circuit 36. The data from circuit 36 is the same as the data stored in code generating circuit 18 of unit 11. When input code data is found to be identical with the data supplied from circuit 36, circuit 35 supplies a coincidence signal to timer 37.

In response to the coincidence signal, timer 37 generates an actuation signal for a predetermined time, e.g., several minutes. This signal is supplied to code transmission circuit 38. Circuit 38 modulates the data supplied from response code generating circuit 39, thus producing a response signal. The actuation signal is also supplied to changeover switch 33, whereby switch 33 couples circuit 38 to antenna 32. Hence, antenna 32 emits the radio waves corresponding to the response signal output by circuit 38. The code output by circuit 39 is identical with the code output by response code generating circuit 20 of unit 11.

Units 11 and 31 shown in FIGS. 1A and 1B constitute a first embodiment of the invention, i.e., a car-locating apparatus. In this apparatus, car-mounted unit 31 stays in a standby condition until it receives the code from portable transmitter-receiver unit 11.

When first switch 12 of portable unit 11 is closed, power supply circuit 26 of control circuit 13 supplies an actuation signal to transmission section 14, thereby actuating this section 14. Simultaneously, changeover instructing circuit 25 gives a changeover instruction to changeover switch 16. The movable contact of switch 16 comes into contact with the output of code transmission circuit 19, whereby the output signal from circuit 19 is supplied to antenna 17. Antenna 17 emits radio waves, thus transmitting this signal. In short, portable unit 11 transmits the transmitting code when first switch 12 is operated.

Antenna 32 of car-mounted unit 31 catches the radio waves from antenna 17 of portable unit 11. The waves are supplied through changeover switch 33 to receiving circuit 34. Circuit 34 generates a code which is input to collating circuit 35, compared with the code generated by code generating circuit 36, and subsequently collated. Then, code transmission circuit 38 is operated for the time set by timer 37, producing a response code signal. The response signal is supplied to antenna 32 via changeover switch 33, and antenna 32 emits radio waves, thus transmitting this code.

Meanwhile, after portable transmitter-receiver unit 11 has transmitted the code, first switch 12 is turned off, whereby receiving section 15 comes into operation. Therefore, the response signal from car-mounted unit 31 is received by antenna 17 and subsequently collated by collating circuit 21. Level display 24 displays the level of this response signal. The user rotates directional antenna 17 in the horizontal plane, while seeing the changing level displayed by display 24. He then reads the angle through which antenna 17 has been rotated when the displayed level reaches the maximum value, thus determining the direction in which the response signal is transmitted and, thereby, locating the car.

Car-mounted unit 31 transmits the response signal only for the time set by timer 37. The power consumption of unit 31 is, therefore, minimal.

Although not shown in FIG. 1A, portable unit 11 has a power supply switch. When this switch is turned on, power is supplied to unit 11. The power supply switch may be replaced by a timer 40 connected to power supply circuit 27 for the receiving section, as shown in FIG. 2. In this case, power supply circuit 27, for receiving section 22, is operated only during the time set by timer 40 after switch 12 has been opened. Circuit 27 supplies no power at any other time, thus saving power.

In the embodiment described above, antenna 17 is directional, and antenna 32 is non-directional. A horizontal dipole antenna with a reflector, a waveguide or a loop antenna with an auxiliary antenna can be used as antenna 17. A vertically positioned dipole antenna can be used as antenna 32.

Figure 3A:
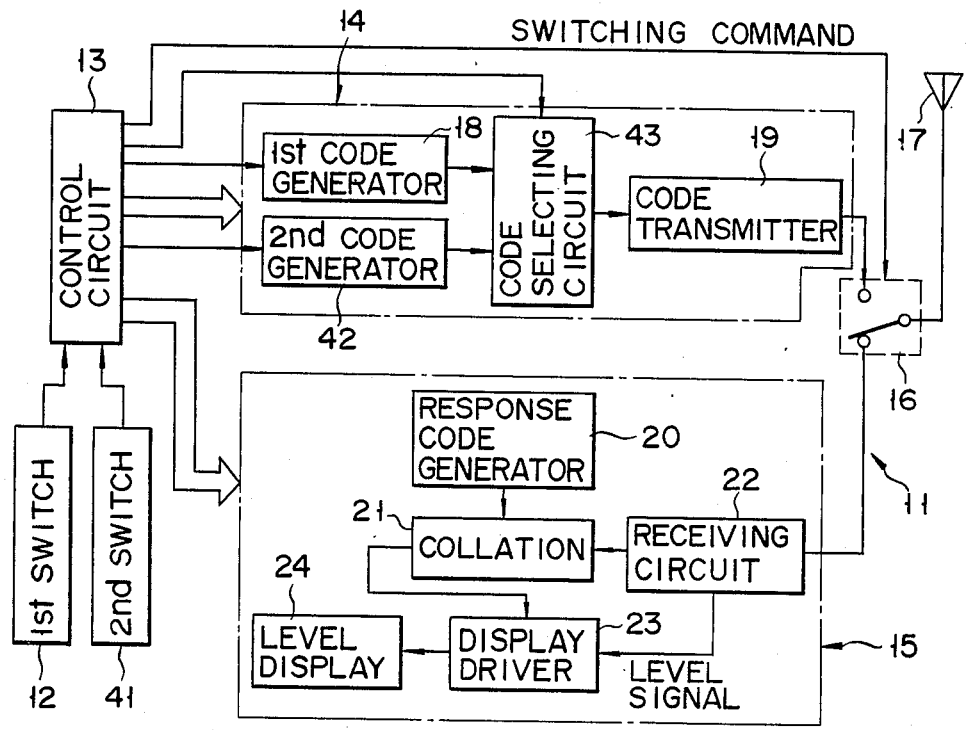
FIGS. 3A and 3B are block diagrams of the portable transmitter-receiver unit and car-mounted transmitter-receiver unit used in a second embodiment of the present invention.
Figure 3B:
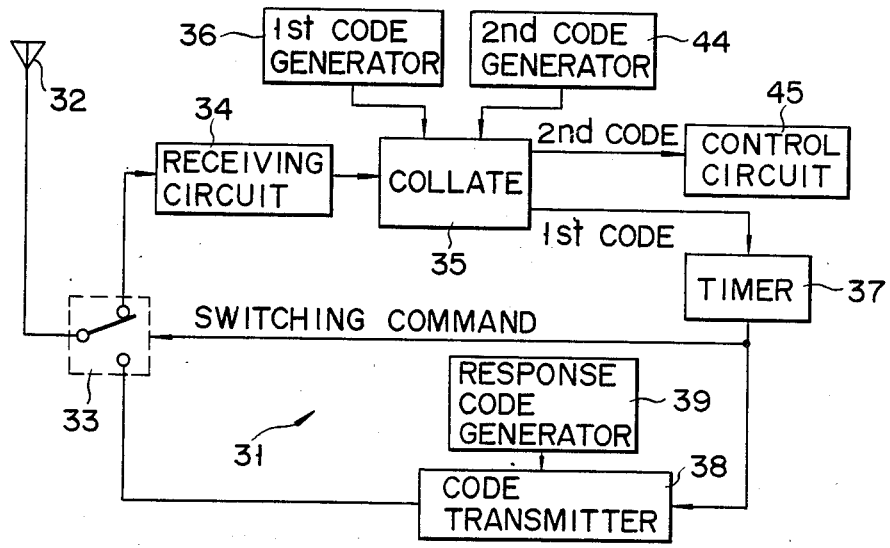

FIGS. 3A and 3B show the portable transmitter-receiver unit 11 and car-mounted transmitter-receiver unit 31, constituting a second embodiment, i.e., a car-locating apparatus which can not only locate a car, but also remote-control devices installed in the car. In these figures, the same numerals are used to designate the same elements as shown in FIGS. 1A and 1B.

The portable unit 11 of the second embodiment is different from unit 11 of FIG. 1A in that two switches 12 and 41 are provided. Switch 41 is closed to remote-control the devices. Further, a transmission section 14 has two code generating circuits 18 and 42. Circuit 42 outputs a control code for remote-controlling the devices. Transmission section 14 has a circuit 43 to select the code output by circuit 18 or from circuit 42 according to an instruction given by control circuit 13. More specifically, circuit 43 supplies the code from circuit 18 when first switch 12 is closed, and the code from circuit 42 when second switch 41 is closed. Either code is input to a code transmission circuit 19.

The car-mounted unit 31 of the second embodiment is different from unit 31 shown in FIG. 1B in that two code generating circuits 36 and 44 are provided, as shown in FIG. 3B. Circuit 36 generates the same code as circuit 18 of portable unit 11, and circuit 44 outputs the same code as circuit 42 of portable unit 11. An input code is supplied, via a receiving circuit 34, to a collating circuit 35, and is compared with the code output from circuit 36 and 44. When it is identical with the code from circuit 44, circuit 35 supplies a coincidence signal to a control circuit 45.

The devices to be controlled by control circuit 45 are the door-lock mechanism, airconditioner, etc. of the car. That is, circuit 45 locks or unlocks the door-lock mechanism and sets or resets the airconditioner.

Two different codes are transmitted from portable unit 11. Car-mounted unit 31 performs two functions: it transmits a response code and controls the door-lock mechanism, airconditioner and the like. As well, car-mounted unit 31 may be designed to transmit alarm codes when the sensors provided in the car detect problems with the door-lock mechanism, airconditioner and the like. Such an embodiment is shown in FIGS. 4A and 4B.

Figure 4A:
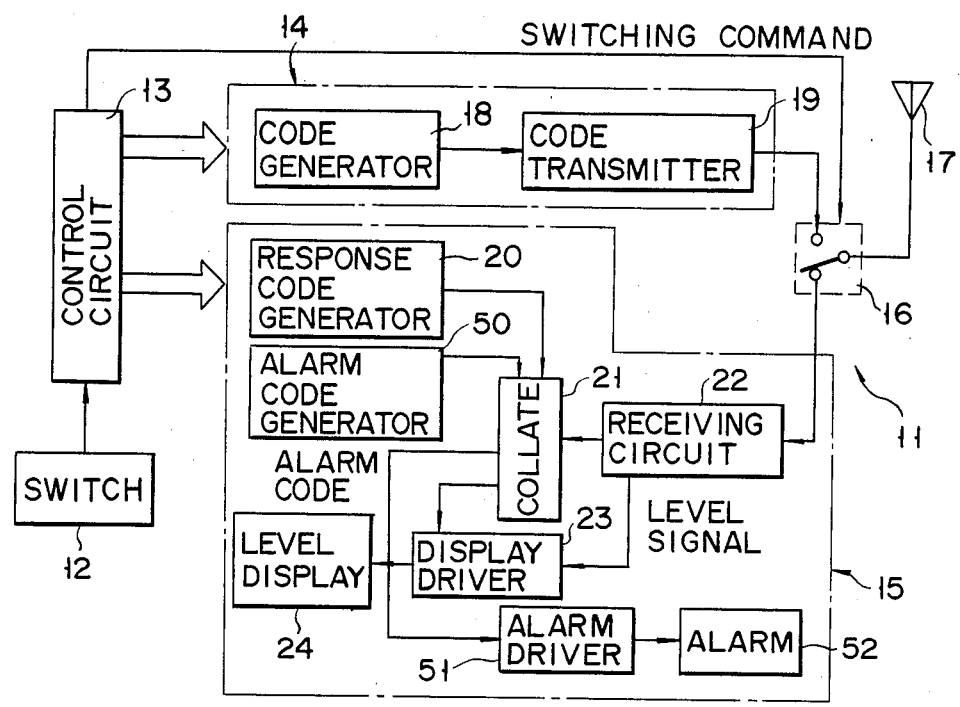
FIGS. 4A and 4B are block diagrams of the portable transmitter-receiver unit and car-mounted transmitter-receiver unit used in a third embodiment of the present invention.
Figure 4B:
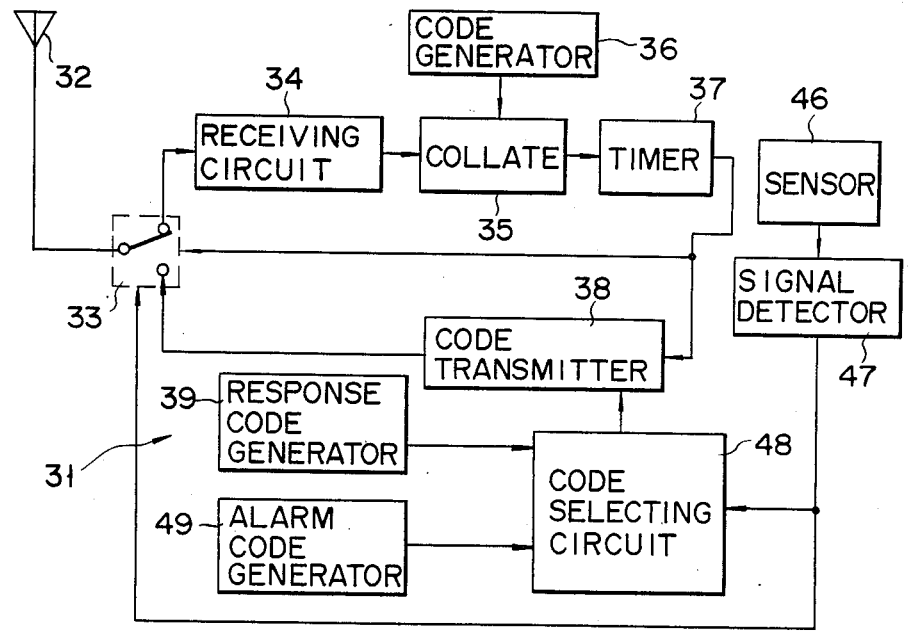

FIGS. 4A and 4B show the portable transmitter-receiver unit 11, and the car-mounted transmitter-receiver unit 31, constituting a third embodiment, which cannot only locate a car but can also inform of an intrusion into the the car. In these figures, the same numerals are used to denote the same elements as shown in FIGS. 1A and 1B.

As shown in FIG. 4B, car-mounted unit 31 has a sensor 46 for detecting an intrusion into the car. Sensor 46 is an ultrasonic sensor or a glass-breaking sensor. When sensor 46 detects an intrusion or the breaking of the window glass, it generates and supplies a signal to a signal detecting circuit 47. The output signal of circuit 47 is supplied to a code selecting circuit 48. It is also supplied to a changeover switch 33, thus connecting the movable contact of this switch to the fixed contact coupled to a receiving circuit 34. An alarm code generating circuit 49 outputs an alarm code to code selecting circuit 48. A response code generating circuit 39 outputs a response code to circuit 48. In response to the output signal of circuit 47, circuit 48 selects the alarm code supplied from circuit 49 to be supplied to a code transmission circuit 38 and then to an antenna 32 via switch 33.

The output signal of signal detecting circuit 47 is given as an actuation signal to a code selecting circuit 48. Circuit 48 is thus operated, supplying the alarm code to transmitter 38. Hence, when the car is intruded into, car-mounted unit 31 transmits an alarm code.

In portable unit 11 of FIG. 4A, the response code output by a response code generating circuit 20 is supplied to a collating circuit 21. The input code output by a receiving circuit 22 is also supplied to circuit 21. Further, the alarm code output by an alarm code generating circuit 50 is input to circuit 21. Circuit 21 compares the input code with response code signal and also with the alarm code. When the input code is identical with the alarm code, circuit 21 supplies an actuation signal to an alarm drive circuit 51. In response to the actuation signal, circuit 51 drives an alarm device 52. Device 52, therefore, sends an alarm. Portable unit 11, or, more particularly, its receiving section 15, is supplied with power at all times so that it can receive any input codes.

Figure 5A:
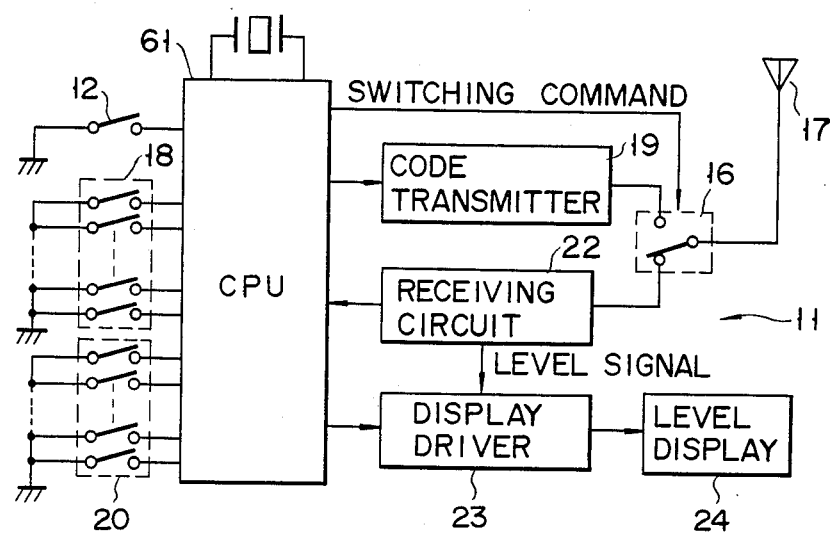
FIGS. 5A and 5B are block diagrams of the portable transmitter-receiver (unit and car-mounted transmitter-receiver unit used in a fourth embodiment of the present invention.
Figure 5B:
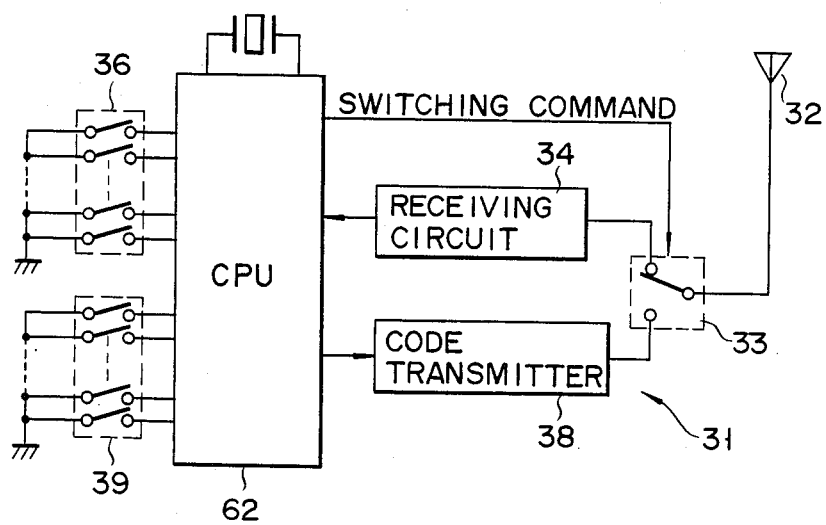

The portable unit 11 and car-mounted unit 31 of each embodiment described above can be made of microcomputers. FIGS. 5A and 5B show the portable unit 11 and car-mounted unit 31, of a fifth embodiment, which are made of microcomputers and correspond to the units 11 and 31 shown in FIGS. 1A and 1B. In these figures, the same numerals are used to indicate the same elements as shown in FIGS. 1A and 1B.

The portable transmitter-receiver unit 11 of FIG. 5A has a microprocessor 61. The output signal of a first switch 12, the output codes of a code generating circuit 18 and a response code generating circuit 20 are input to microprocessor 61. Circuits 18 and 20 each comprise a plurality of switches. The switches of either circuit are turned on in a specific combination, thus generating a specific code. The codes generated by circuits 18 and 20 are input to microprocessor 61. Hence, the secrecy of both codes can be secured.

In response to the output signal of first switch 12, microprocessor 61 gives an actuation signal to a code transmission circuit 19. Circuit 19 outputs a transmitting signal. This signal is supplied to an antenna 17 through a changeover switch 16 which is controlled by an instruction from microprocessor 61. Antenna 17 emits the radio waves, thereby transmitting the signal.

Any radio waves which antenna 17 has received are converted into a code. This input code is supplied to a receiving circuit 22 through changeover switch 16. The input code is ultimately input to microprocessor 61, and is compared with the response code output by a response code generating circuit 20. Upon receipt of the input code, receiving circuit 22 outputs a level signal to a display drive circuit 23. Circuit 23 supplies a drive signal to a level display 24, and the level of the input code is displayed.

Car-mounted unit 31, shown in FIG. 5B, has a microprocessor 62 similar to microprocessor 61, a code generating circuit 36 and a response code generating circuit 39. Like circuits 18 and 20 of portable unit 11, circuits 36 and 39 each comprise a plurality of switches. The codes output by circuits 36 and 39 are input to microprocessor 62. Any radio waves caught by an antenna 32 are supplied to a receiving circuit 34 via a changeover switch 33. The output code from circuit 34 is then input to microprocessor 62 and compared with the code generated by circuit 36. When the input code to microprocessor 62 is identical with the code output by circuit 36, microprocessor 62 supplies a changeover instruction to switch 33 and actuates a code transmission circuit 38. Then, the response code signal generated by response code generating circuit 39 is supplied to circuit 38 and the response signal from circuit 38 is supplied to antenna 32. Antenna 32 then emits the radio waves, transmitting this response code.

Figure 6A:
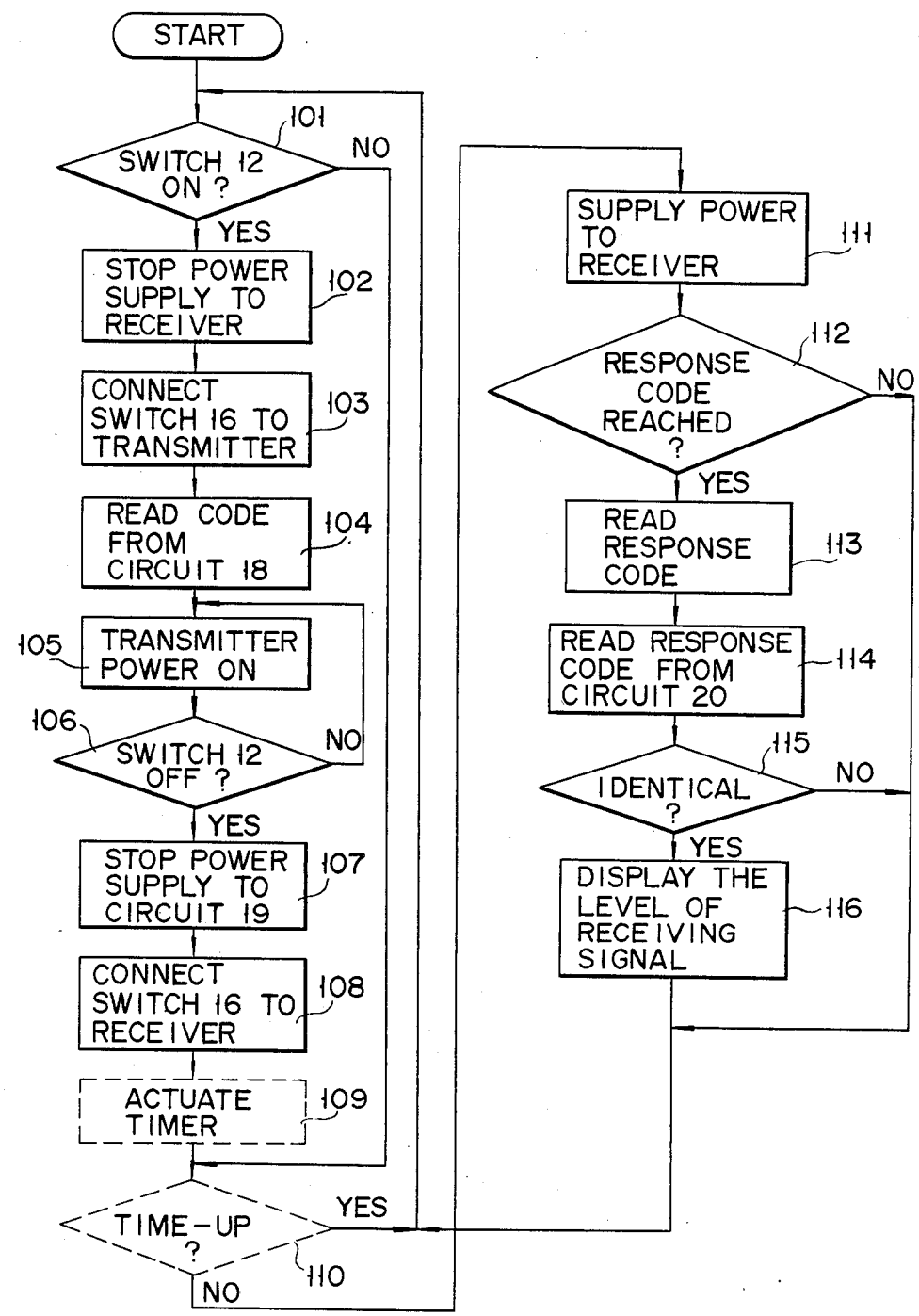
FIGS. 6A and 6B are flow charts illustrating the operation of the fourth embodiment.

FIG. 6A is a flow chart explaining the operation of portable unit 11 shown in FIG. 5A. In step 101, it is determined whether or not switch 12 is closed. When switch 12 is closed, the power supply to receiving circuit 22 is stopped in step 102. Then, in step 103, the movable contact of changeover switch 16 is connected to code transmission circuit 19. In the next step, 104, microprocessor 62 reads the code from code generating circuit 18. The operation advances to step 105 in which power is supplied to circuit 19. In step 106, it is determined whether or not switch 12 is opened. If switch 12 is still closed, the flow returns to step 105. Hence, steps 105 to 106 are repeated until switch 12 is opened. When switch 12 is opened, the flow advances to step 107. In step 107, the power supply to code transmission circuit 19 is stopped. Then, in step 108, the movable contact of changeover switch 16 is connected to receiving circuit 22. In step 109, the timer provided in microprocessor 61 is actuated. In step 110, it is judged whether or not the count of this timer has reached the set value. When the count of the timer has not reached the set value, the power supply to receiving circuit 22 is started in step 111. Hence, portable unit 11 is set in the waiting condition. (Steps 109 and 110 may be omitted. In this case, switch 16 is changed over, and the flow jumps to step 111.) In the next step, 112, it is determined whether or not a response code has come from car-mounted unit 31. When the response code is received, microprocessor 31 reads this receiving response code in step 113. In step 114, microprocessor 61 reads the response code from response code generating circuit 20. In step 115, it is judged whether or not the receiving response code is identical with the code read from circuit 20. When it is identical with the output code of circuit 20, the flow advances to step 116, in which the level of the receiving response signal is displayed.

Figure 6B:
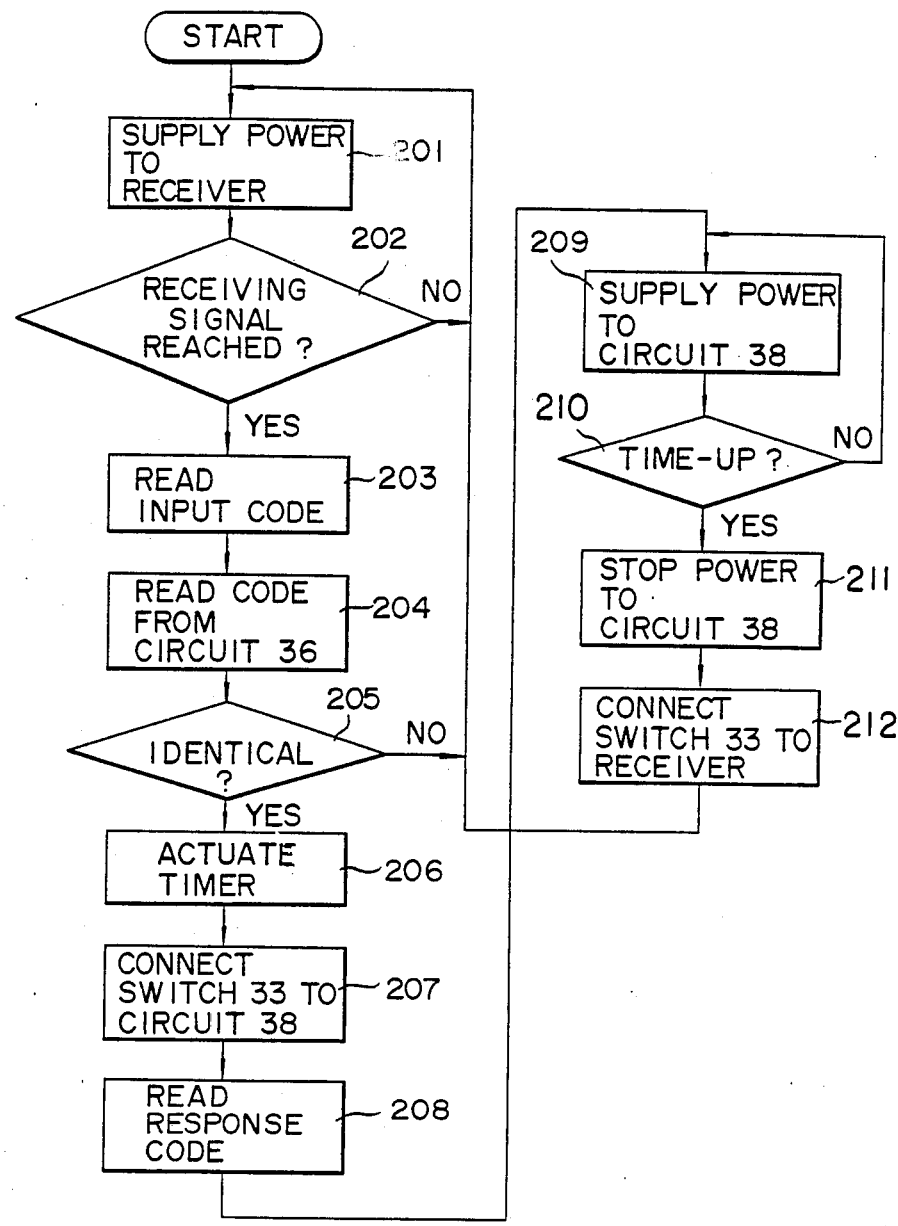

FIG. 6B is a flow chart illustrating the operation of car-mounted unit 31 shown in FIG. 5B. In step 201, the power supply to receiving circuit 34 is started. In step 202, it is determined whether or not unit 31 has received a code from portable unit 11. When unit 31 has received this code, the code is input to microprocessor 63 in step 203. In step 204, microprocessor 32 reads the code from code generating circuit 36. The flow advances to step 205, in which the input code is compared with the code read from circuit 36. When the input code is identical with the code output by circuit 36, the timer provided in microprocessor 62 is actuated in step 206. In the next step, 207, the movable contact of changeover switch 33 is connected to code transmission circuit 38. In step 208, microprocessor 62 reads the response code from response code generating circuit 39. In step 209, the power supply to code transmission circuit 38 is started, whereby the response signal is supplied to antenna 32 through changeover switch 33. Hence, antenna 32 emits the radio waves corresponding to this signal.

In step 210, it is determined whether or not the time set by the timer has elapsed. Steps 209 and 210 are repeatedly executed until the set time elapses, whereby power is continuously supplied to transmission circuit 38. After the set time has elapsed, step 211 is executed to stop the power supply to circuit 38. Thus, the unit ceases to operate as a transmitter. Then, switch 33 is shifted to the "receiver" side in step 212, thereby making the unit operate as a receiver.

FIGS. 7A and 7B show the portable unit 11 and car-mounted unit 31, of a fifth embodiment, which are made of microcomputers and correspond to the units 11 and 31 shown in FIGS. 3A and 3B. In these figures, the same numerals are used to indicate the same elements as shown in FIGS. 1A and 1B. As in the fifth embodiment, two microprocessors 61 and 62 are provided in units 11 and 31, respectively. The second code, generated by a code generating circuit 42, and comprised of a plurality of switches, is supplied to microprocessor 61. The second code, generated by a code generating circuit 44, and comprised of a plurality of switches, is supplied to microprocessor 62. Microprocessor 62 supplies an actuation signal to a control circuit 45 for controlling devices installed in the car. In all other respects, the fifth embodiment is the same as the fourth embodiment.

Figure 8A:
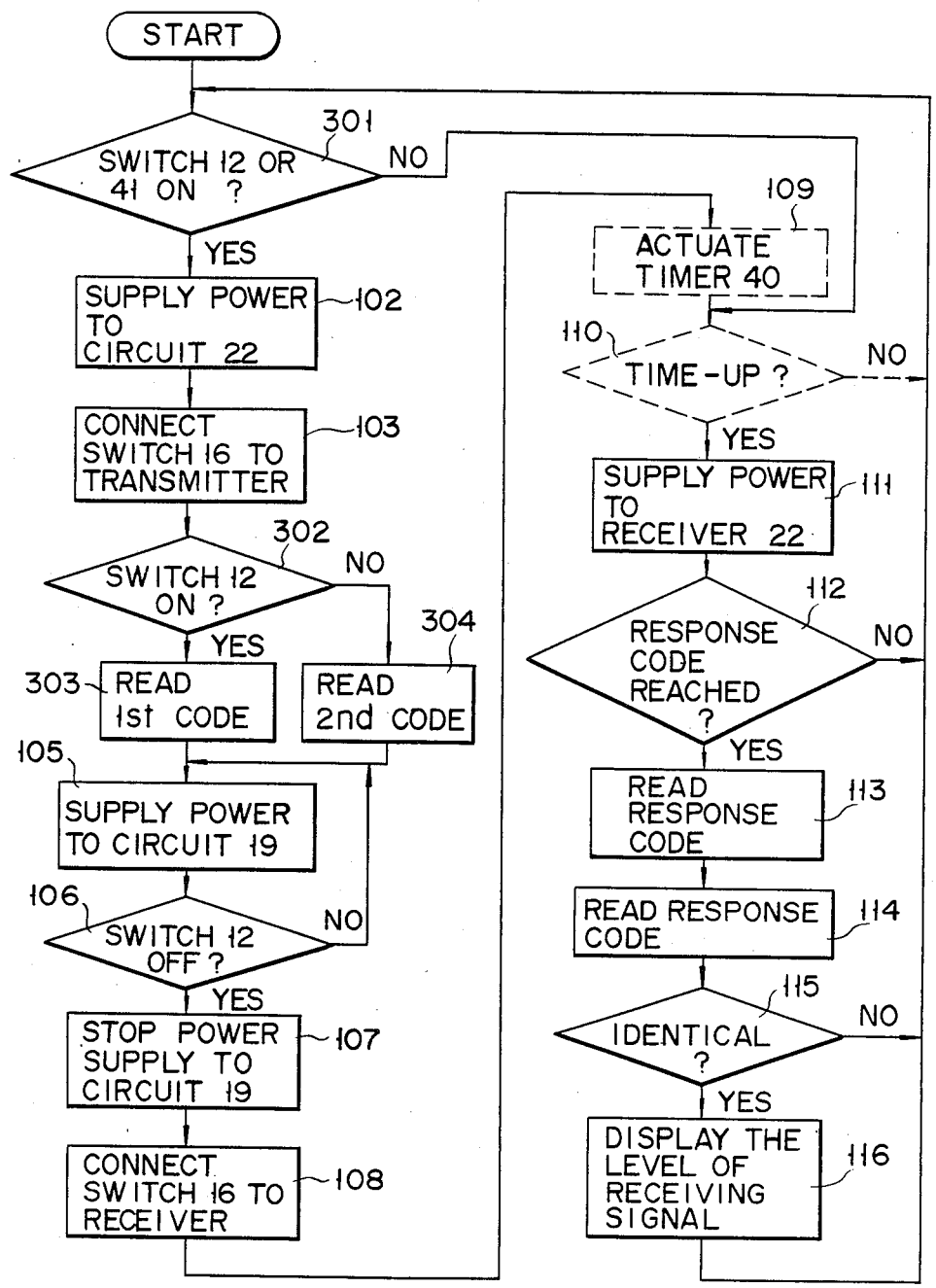
FIGS. 8A and 8B are flow charts illustrating the operation of the fifth embodiment.

FIG. 8A is a flow chart illustrating the operation of portable unit 11 shown in FIG. 7A. Basically, the flow chart is similar to that of FIG. 6A, but differs in the following respects. In step 301, it is judged whether first switch 12 or second switch 41 is closed. If switch 12 or 41 is closed, the power supply to receiving circuit 22 is started in step 102. Then, in step 103, the movable contact of a changeover switch 16 is connected to a code transmission circuit 19. In step 302, it is determined whether or not first switch 12 is closed. When switch 12 is closed, the first code is supplied from code generating circuit 18 to microprocessor 61 in step 303. When switch 12 is open and switch 41 is closed, the second code is supplied from code generating circuit 42 to microprocessor 61 in step 304. Then, the same steps as steps 106-116, shown in FIG. 6A, are executed.

Figure 8B:
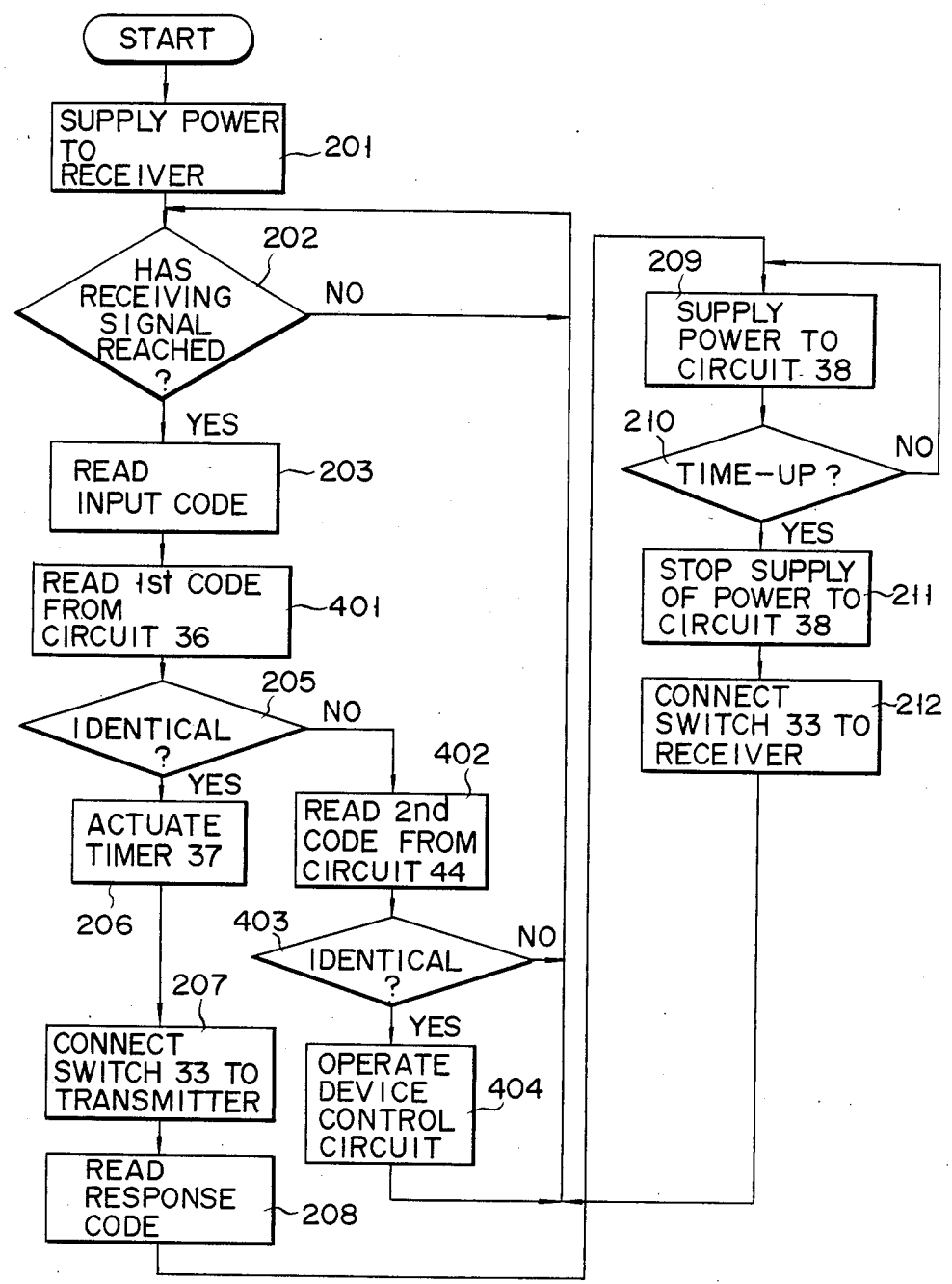

FIG. 8B is a flow chart illustrating the operation of car-mounted unit 31 shown in FIG. 7B. Basically, this flow chart is similar to that of FIG. 6B, but differs in the following respects. In step 401, the first code is supplied from code generating circuit 36 to microprocessor 62. In the next step, 205, it is determined whether or not an input code is identical with the first code. When the input code is identical with the first code, the flow advances to step 206. When it is not identical with the first code, the flow advances to step 402 in which the second code is supplied from code generating circuit 44 to microprocessor 62. In step 403, it is judged whether or not the input code is identical with the second code. When the input code is identical with the second code, microprocessor 62 supplies an instruction signal to control circuit 45.

Figure 9A:
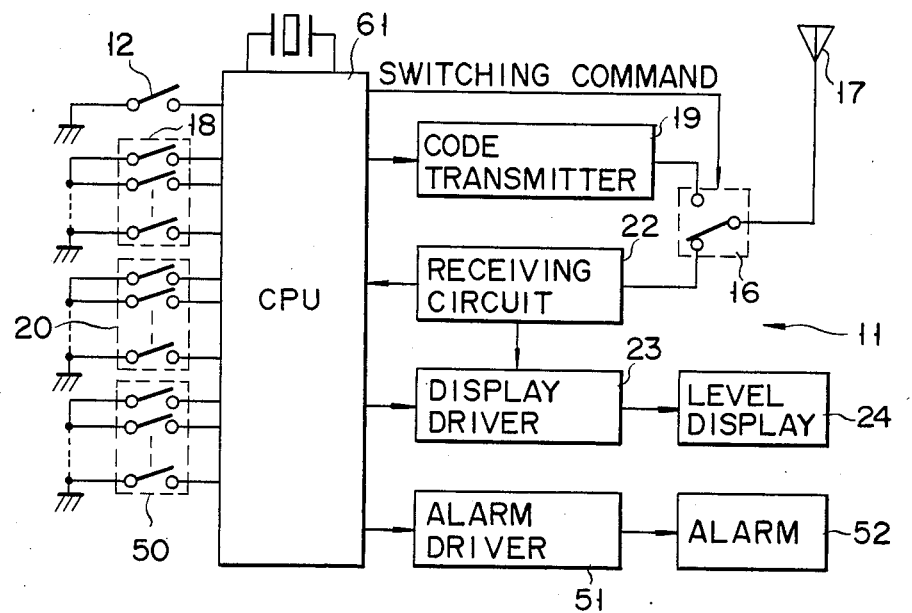
FIGS. 9A and 9B are block diagrams of the portable transmitter-receiver unit and car-mounted transmitter-receiver unit used in a sixth embodiment of the present invention.
Figure 9B:
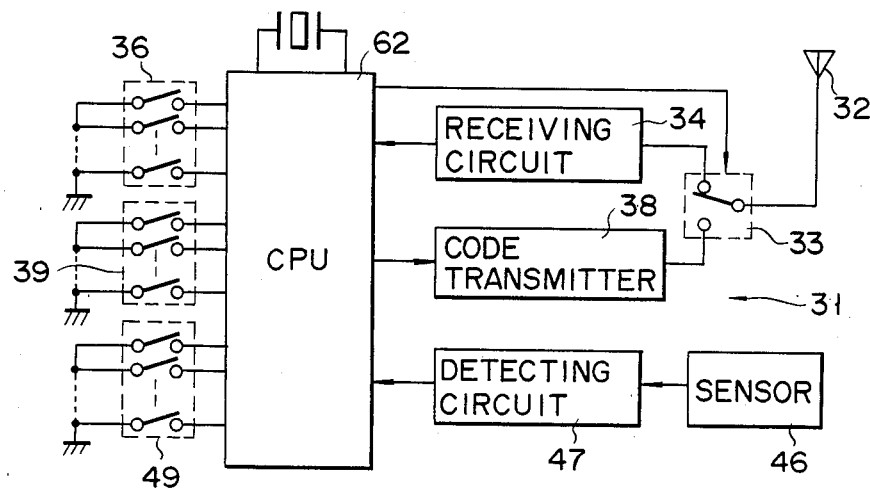

FIGS. 9A and 9B show the portable unit 11 and car-mounted unit 31 of a sixth embodiment, which are made of microcomputers and correspond to the units 11 and 31 shown in FIGS. 4A and 4B. In these figures, the same numerals are used to indicate the same elements as shown in FIGS. 1A and 1B. As in the fourth and fifth embodiments, two microprocessors 61 and 62 are provided in units 11 and 31, respectively. Portable unit 31 has an alarm code generating circuit 50 which comprises a plurality of switches and supplies a code to microprocessor 61. Microprocessor 61 supplies an instruction to an alarm drive circuit 51, whereby a alarm device 52 is operated. Car-mounted unit 31 has a sensor 46, a signal detecting circuit 47 and an alarm code generating circuit 49. When sensor 46 detects a problem, circuit 47 supplies a signal to microprocessor 62. At the same time, alarm code generating circuit 49 supplies an alarm code to microprocessor 62.

Figure 10A:
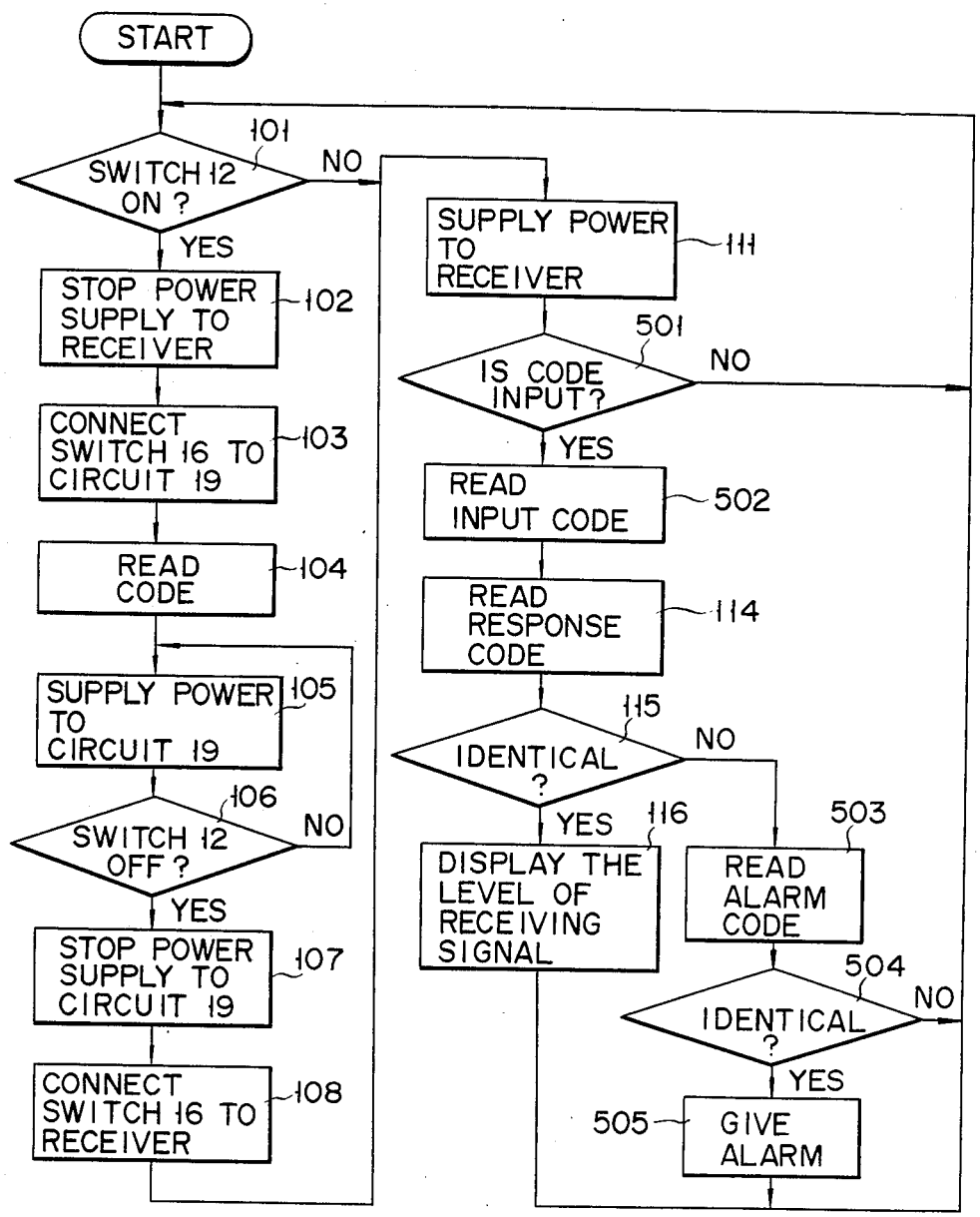
FIGS. 10A and 10B are flow charts illustrating the operation of the sixth embodiment.

FIG. 10A is a flow chart illustrating the operation of portable unit 11 shown in FIG. 9A. Basically, the flow chart is similar to that of FIG. 6A but differs in the following respects. In step 111, the power supply to a receiving circuit 22 is started. In the next step, 501, it is determined whether or not a code has been input to circuit 22. When a code has been input, it is supplied to microprocessor 61 in step 502. Then, in step 114, a response code is supplied from a response code generating circuit 20 to microprocessor 61. In step 115, it is judged whether or not the input code is the same as the response code. When the input code is identical with the response code signal, the flow advances to step 116. When it is determined at step 115 that the input code data is not identical with the response code data, step 503 is executed to read the alarm code data. Then, in step 504, it is determined whether or not the input code data is identical to the alarm code data. If the determination is affirmative (yes), step 505 is executed to sound the alarm. The other parts are identical with the fourth embodiment shown in FIG. 6A.

Figure 10B:
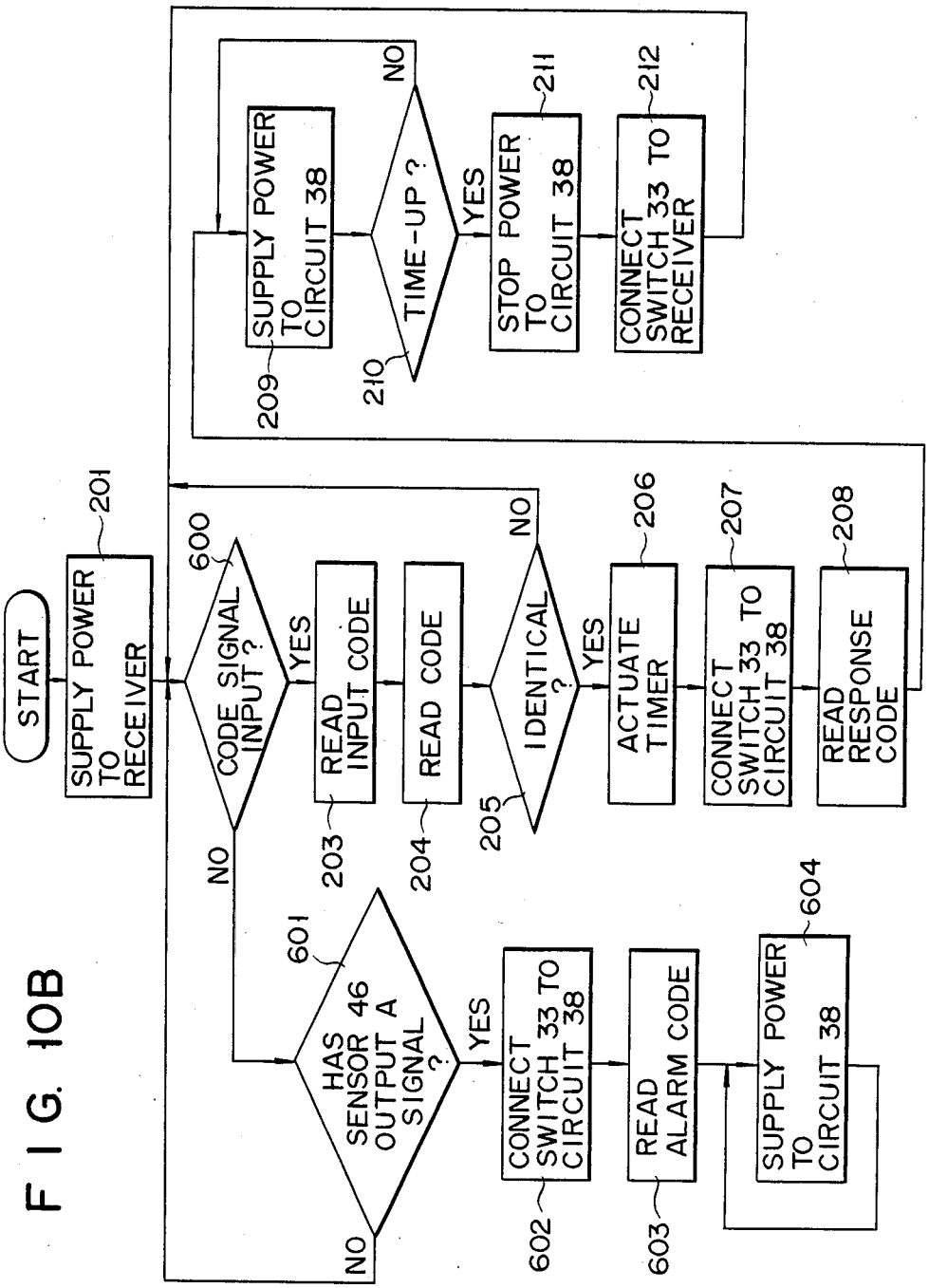

FIG. 10B is a flow chart illustrating the operation of portable unit 31 shown in FIG. 9B. Basically, the flow chart is similar to that of FIG. 6B but differs in the following respects. In step 201, the power supply to a receiving circuit 34 is started. In the next step, 600, it is judged whether or not a code has been input to circuit 34. When a code has been input, the steps identical with steps 203-212, shown in FIG. 6B, are executed. When no code has been input to circuit 34, the flow advances to step 601. In step 601, it is determined whether or not a sensor 46 has output a signal informing that a problem has been detected. When sensor 46 has output such a signal, the movable contact of a changeover switch 33 is connected to a code transmission circuit 38 in step 602. In the next step, 603, an alarm code is supplied from an alarm code generating circuit 49 to microprocessor 62. In step 604, the power supply to a code transmission circuit 38 is started, whereby the alarm code is transmitted from unit 31.

In all the embodiments described above, radio waves are used to transmit code data between portable unit 11 and car-mounted unit 31. The transmission medium is not, however, limited to radio waves. Since the distance between units 11 and 31 is relatively short, ultrasonic waves or infrared rays may be utilized.

What is claimed is:

1. An apparatus for finding the location of a car within a vast area, comprising a portable transmitter/receiver unit and a car-mounted transmitter/receiver unit, said portable transmitter/receiver unit including:
first code-setting means for storing a particular transmitting code pertinent to the car;
fifth code-setting means for storing an instruction code;
a first switch for generating a car-locating instruction, when closed;
a second switch for generating an instruction to control a device which is provided in the car and which is desirably operated before the driver enters the car;
a first transmitting section for generating a transmission signal containing the transmitting code when said first switch is closed, and for generating a transmission signal containing the instruction code when said second switch is closed;
directional antenna means for transmitting any transmission signal generated by said first transmitting section, and for receiving a response signal containing a response code, from said car-mounted transmitter/receiver unit;
second code-setting means for storing a particular response code pertinent to the car;
a first receiving section for receiving the response code transmitted from said car-mounted transmitter/receiver unit, said first receiving section generating a signal having a level corresponding to the received level of the response signal, and detecting the response code contained in the response signal;
first collating means for collating the code contained in the signal received by said first receiving section, with the response code set in said second code setting means, and for generating a display instruction when the code contained in the signal received by said first receiving section coincides with the response code set in said second code setting means;
display-drive means, responsive to the display instruction from said first collating means, for generating a display-drive signal corresponding to the signal generated by said first receiving section; and
level-display means, responsive to the display-drive signal, for indicating the direction from said portable transmitter/receiver unit to the car when the maximum level of the signal generated by said first receiving section is indicated on the display said car-mounted transmitter/receiver unit including:
non-directional antenna means;
a second receiving section for detecting a code of a signal received by and said non-directional antenna means;
third code-setting means for storing a code identical to the transmitting code set in said first code-setting means;
fourth code-setting means for storing a code identical to the response code set in said second code-setting means;
sixth code-setting means for storing a code identical to the instruction code set in said fifth code-setting means;
second collating means for collating the code detected by said second receiving section, with the code set in said third and sixth code-setting means, and for generating a first coincidence signal when the detected code coincides with the code set in said third code-setting means, and a second coincidence signal when the detected code coincides with the code set in said sixth code-setting means;
a second transmitting section, responsive to the first coincidence signal from said second collating means, for generating a response signal containing the response code set by said fourth code-setting means;
transmission power supply control means for supplying power to said second transmitting section for a prescribed period of time after said second collating means for generated the first coincidence signal;

response-code transmission means for transmitting the response signal generated by said second transmitting section, through said non-directional antenna means, when power is supplied to said second transmitting section; and device-control means for controlling said device, in response to the second coincidence signal from said second collating means.

2. An apparatus according to claim 1, wherein said device control means controls a door lock mechanism of the car.

3. An apparatus according to claim 1, wherein said device control means controls an air conditioner installed in the car.

4. An apparatus according to claim 1, wherein said transmission power supply-control means includes a timer which is actuated when said second collating means detects that the code received by said second transmitting section is identical to the transmitting code, and wherein power is supplied to said second transmitting section for the period of time set in this timer.

5. An apparatus according to claim 1, wherein said directional antenna means includes an antenna element and a changeover switch connecting the antenna element to said first receiving section, said changeover switch being changed over and connected to said first transmitting section when said first or second switch is closed.

6. An apparatus according to claim 1, wherein said non-directional antenna means includes an antenna element and a changeover switch connecting the antenna element to said second received section, said changeover switch being changed over and connected to said second transmitting section when power is supplied to said second receiving section.

7. An apparatus according to claim 1, wherein said portable transmitter/receiver unit further includes a first power supply circuit for supplying power to said first transmitting section while said first or second switch is closed, and a second power supply circuit for supplying power to said first receiving section while said first or second switch is open.

8. An apparatus according to claim 7, wherein said second power supply circuit supplies power to said first receiving section for the period of time set by a timer after said first or second switch is opened.

9. An apparatus for finding the location of a car within a vast area, comprising a portable transmitter/receiver unit and a car-mounted transmitter/receiver unit, said portable transmitter/receiver unit including:

first code-setting means for storing a particular transmitting code pertinent to the car;

a first switch for generating a car-locating instruction, when closed;

a first transmitting section for generating a transmission signal containing the transmitting code set in said first code-setting means, when said first switch is closed;

directional antenna means for transmitting the transmission signal generated by said first transmitting section, and for receiving a response signal containing a response code, from said car-mounted transmitter/receiver unit;

second code-setting means for storing a particular response code pertinent to the car;

seventh code-setting means for storing an alarm code;

a first receiving section for receiving the response signal transmitted from said car-mounted transmitter/receiver unit, said first receiving section generating a signal having a level corresponding to the received level of the response signal, and detecting the code contained in the response signal;

first collating means for collating the code detected from the signal received by said first receiving section, with the response code and the alarm code stored, respectively, in said second and seventh code-setting means, and for generating a first coincidence signal when the detected code coincides with said response code, and a third coincidence signal when the detected code coincides with said alarm code;

display-drive means, responsive to the first coincidence signal from said first collating means, for generating a display-drive signal corresponding to the signal generated by said first receiving section;

level-display means, responsive to the display-drive signal, for indicating the direction from said portable transmitter/receiver unit to the car when the maximum level of the signal generated by said first receiving station is indicated on the display;

alarm-producing means for producing an alarm when said first collating means generates the third coincidence signal;

said car-mounted transmitter/receiver unit including:

non-directional antenna means;

a second receiving section for detecting a code of a signal receiver by said non-directional antenna means;

third code-setting means for storing a code identical to the transmitting code set in said first code-setting means;

fourth code-setting means for storing a code identical to the response code set in said second code-setting means;

eighth code-setting means for storing a code identical to the alarm code set in said seventh code-setting means;

second collating means for collating the code detected by said second receiving section, with the transmission code set in said third code-setting means, and for generating a second coincidence signal when the code detected by said second receiving section coincides with the transmission code set in said third code-setting means;

trouble-sensing means including a sensor which detects the intrusion of an unauthorized person into the car, for generating an alarm signal in response to a signal generated by the sensor;

a second transmitting section for generating a response signal containing the response code set by said fourth code-setting means when the code received by said second receiving section is identical to the code set by said third code-setting means, and for generating a response signal containing the alarm code set by said eighth code-setting means when said trouble-sensing means generates the alarm signal;

transmission power supply control means for supplying power to said second transmitting section for a prescribed period of time when said second collating means generates the first coincidence signal, or when said trouble-sensing means generates the alarm signal; and;

response-signal transmitting means for transmitting the response signal containing the response code or the alarm code, via said non-directional antenna means when power is supplied to said second transmitting section.

10. An apparatus according to claim 9, wherein said sensor of said trouble-sensing means comprises an ultrasonic sensor which detects the presence of an intruder in the car.

11. An apparatus according to claim 9, wherein said sensor of said trouble-sensing means comprises a sensor which detects the breaking of a window of the car.

* * * * *